US011981811B2

United States Patent
Tsou et al.

(10) Patent No.: US 11,981,811 B2
(45) Date of Patent: May 14, 2024

(54) USE OF THERMOPLASTIC POLYURETHANE AND IMPACT RESISTANT COMPOSITE LAMINATE

(71) Applicant: SUNKO INK CO., LTD., Taichung (TW)

(72) Inventors: Chiu-Peng Tsou, Taichung (TW); Zhen-Wei Chen, Taichung (TW); Ting-Ti Huang, Taichung (TW); Sheng-Mao Tseng, Taichung (TW)

(73) Assignee: SUNKO INK CO., LTD., Taichung (TW)

( * ) Notice: Subject to any disclaimer, the term of this patent is extended or adjusted under 35 U.S.C. 154(b) by 0 days.

(21) Appl. No.: 17/689,399

(22) Filed: Mar. 8, 2022

(65) Prior Publication Data

US 2023/0104699 A1 Apr. 6, 2023

(30) Foreign Application Priority Data

Sep. 30, 2021 (TW) .................. 110136540

(51) Int. Cl.
*C08L 75/08* (2006.01)
*B32B 5/18* (2006.01)
(Continued)

(52) U.S. Cl.
CPC ................ *C08L 75/08* (2013.01); *B32B 5/18* (2013.01); *B32B 5/265* (2021.05); *B32B 27/40* (2013.01);
(Continued)

(58) Field of Classification Search
CPC . C08L 75/08; C08L 75/06; B32B 5/18; B32B 5/265; B32B 27/40; B32B 2250/03;
(Continued)

(56) References Cited

U.S. PATENT DOCUMENTS 7,381,460 B2  6/2008 Palmer et al.
2006/0206977 A1*  9/2006 Hammons ............... B60N 2/522
2/16
(Continued)

FOREIGN PATENT DOCUMENTS

CN      108504069 A  *  9/2018  ............ C08L 69/00
CN      211493096 U  *  9/2020
(Continued)

OTHER PUBLICATIONS

Machine translation of JP 2006-328221 A (Year: 2006).*
(Continued)

*Primary Examiner* — Callie E Shosho
*Assistant Examiner* — Steven A Rice
(74) *Attorney, Agent, or Firm* — WPAT, P.C

(57) ABSTRACT

Provided are a use of a thermoplastic polyurethane for forming an impact resistant layer and an impact resistant composite laminate. The thermoplastic polyurethane comprises a structural unit represented by Formula (I):

$$\left[O-R-O-\overset{O}{\underset{\|}{C}}-\underset{\text{(benzene ring)}}{}-\overset{O}{\underset{\|}{C}}-O-R\right]_n ; \quad (I)$$

wherein each R independently is an alkylene group having 2 to 8 carbon atoms or $CH_2CH_2OCH_2CH_2$; n is a number from 2 to 13; and the structural unit has a Mn ranging from 700 g/mole to 2500 g/mole. In addition, the impact resistant layer has a thickness of larger than 1.5 mm. The impact resistant composite laminate com-
(Continued)

prises a base layer and the impact resistant layer disposed on the base layer.

6 Claims, 6 Drawing Sheets

(51) Int. Cl.
*B32B 5/26* (2006.01)
*B32B 27/40* (2006.01)
*B32B 37/10* (2006.01)
*D01D 5/08* (2006.01)

(52) U.S. Cl.
CPC ............... *B32B 37/10* (2013.01); *D01D 5/08* (2013.01); *B32B 2250/03* (2013.01); *B32B 2262/0292* (2013.01); *B32B 2307/558* (2013.01); *B32B 2307/732* (2013.01); *B32B 2571/00* (2013.01); *D10B 2331/10* (2013.01)

(58) Field of Classification Search
CPC ...... B32B 2262/0292; B32B 2307/558; B32B 2307/732; B32B 2571/00
USPC ....................................................... 428/423.1
See application file for complete search history.

(56) References Cited

U.S. PATENT DOCUMENTS

| 2015/0252187 A1* | 9/2015 | Liu | C08L 99/00 524/14 |
| 2018/0318696 A1* | 11/2018 | Henry | B32B 5/245 |
| 2019/0053563 A1* | 2/2019 | Ganly | A42B 3/00 |
| 2023/0145775 A1* | 5/2023 | Turvey | A41D 19/01523 2/16 |

FOREIGN PATENT DOCUMENTS

| CN | 211994507 U | * | 11/2020 |
| JP | 2006328221 A | * | 12/2006 |
| JP | 2017-197736 A | | 11/2017 |
| TW | I441845 B | | 6/2014 |
| TW | I542287 B | | 7/2016 |
| TW | I697512 B | | 7/2020 |
| WO | 96/39885 A1 | | 12/1996 |
| WO | 2010/113907 A1 | | 10/2010 |

OTHER PUBLICATIONS

Machine translation of TW 1697512 B (Year: 2020).*
Machine translation of CN 211493096 U (Year: 2020).*
Machine translation of CN 108504069 A (Year: 2018).*
Machine translation of CN 211994507 U (Year: 2020).*

* cited by examiner

USE OF THERMOPLASTIC POLYURETHANE AND IMPACT RESISTANT COMPOSITE LAMINATE

CROSS-REFERENCE TO RELATED APPLICATION

Pursuant to 35 U.S.C. § 119(a), this application claims the benefit of the priority to Taiwan Patent Application No. 110136540, filed on Sep. 30, 2021. The content of the prior application is incorporated herein by its entirety.

BACKGROUND OF THE INVENTION

1. Field of the Invention

The present disclosure relates to a use of thermoplastic polyurethane, and more particular to a use for forming an impact resistant layer to dissipate the impact force received. The present disclosure also relates to an impact resistant composite laminate comprising the same.

2. Description of the Prior Arts

Generally speaking, grips of hand tools, walking sticks, clubs, guns, bicycles, motorcycles and multiple sport goods are made of hard materials such as metals, rigid plastics and woods. Accordingly, vibrations are directly transmitted to the users' hands when the grips are in use, and therefore the users will feel uncomfortable after holding these grips for a long time. In addition, while standing, walking and exercising, people's feet not only support the weight of the body but also withstand the reaction force from the ground where the feet tread. An athlete's body may be injured because of a high impact hit during exercise such as catching a ball, hitting a ball, bumping or falling over. Further, fragile goods or precision instruments may be damaged by vibrations or impacts. In order to solve the problems, industries, such as footwear, sports protection, instrument protection and medical protection, hope to develop protective products which can effectively dissipate vibrations and resist impact.

For example, U.S. Pat. No. 7,381,460B2 provides an energy absorbing composite, which relates to the famous impact protection material, D3O. The energy absorbing composite contains a solvent-type polyurethane foam as matrix, and polyborodimethylsiloxane (PBDMS) is added as dilatant and dispersed throughout the matrix during the manufacture of the matrix; the resulting energy absorbing composite is resiliently compressible. Essentially, the energy absorbing composite belongs to a foamed polyurethane composite with a closed-cell cell structure.

TWI542287B provides a vibration-damping material. The vibration-damping damping material comprises multi-elastic layers which are substantially non-porous porous and the man-made fibrous material with high tensile strength, and the non-porous elastic layers are mainly composed of silicone rubber.

JP2017-197736 A provides a polyester resin composition for vibration-damping damping material. The composition includes a thermoplastic polyester resin (A) constituted of a dicarboxylic acid component and a diol component, a plasticizer (B) having a specific structure, and an inorganic filler (C).

In recent years, sustainable development is an important goal calling for action by all countries; therefore, the trend of circular economy containing "resource recycling" is booming, and the footwear and sports equipment industries most actively participate in this trend. If environmentally friendly thermoplastic elastomer materials in prior arts such as thermoplastic ester resins and thermoplastic polyurethanes (TPU) are used to replace environmentally unfriendly materials, such as solvent-type PUs, thermosetting silicones and a difficult-recycling composite containing a variety of materials, the impact dissipation material in the waste can be recycled and the model of green consumption behavior can be constructed.

TWI697512 B is the prior art most relevant to the present disclosure. It provides a TPU having a glass transition temperature (Tg) between an ambient temperature and normal body temperature, so the article produced by the TPU is rigid and stiff at ambient temperature and soft and elastic at normal body temperature when contacting the human body. Accordingly, the article can confer a new tactility and delight when it contacts the human body, and it is suitable for the applications of textiles, shoe materials, decorations, toys, sport goods and daily necessities. Aforesaid TPU may be a TPU including a dicarboxyphenyl polyester structural unit or a TPU including a 10-(2,3-dicarboxypropyl)-9,10-dihydro-9-oxa-10-phosphaphenanthrene-10-oxide (DOPO-ITA) polyester structural unit. The patent discloses a non-woven film and a solvent-free hot melt adhesive that can be made by the aforesaid TPU, emphasizing the softness and comfort while in contact with the human body; however, the patent does not explore or disclose any information about the impact resistance of the TPU and the articles produced therefrom.

SUMMARY OF THE INVENTION

In view of the conventional technical defects, an objective of the present disclosure is to provide a use of a TPU for forming an impact resistant layer, which has a good impact resistance to cushion external force effectively.

To achieve the aforesaid objective, the present disclosure provides a use of a TPU for forming an impact resistant layer, wherein the impact resistant layer has a thickness of larger than 1.5 millimeters (mm).

Wherein, the TPU comprises a structural unit represented by Formula (I):

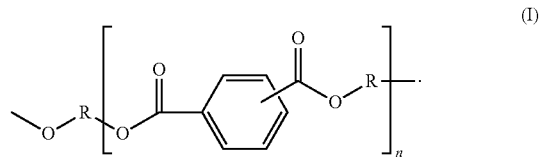

In Formula (I), each R independently is an alkylene group having 2 to 8 carbon atoms or $CH_2CH_2OCH_2CH_2$;
n is a number from 2 to 13; and
the structural unit has a number-average molecular weight (Mn) ranging from 700 g/mole to 2500 g/mole.

By means of using the TPU comprising the structural unit represented by Formula (I) to form an impact resistant layer with a specific thickness, the impact resistant layer shows a good impact resistance. As a result, when the impact resistant layer withstands an impact force, the impact resistant layer can reduce at least 20% of the impact force. Therefore, it can be widely used for various protective products.

Preferably, in the overall structural units of the TPU, the structural unit represented by Formula (I) may be in the range from 6 molar percent (mole %) to 25 mole %.

Preferably, the TPU may comprise a structural unit represented by Formula (II):

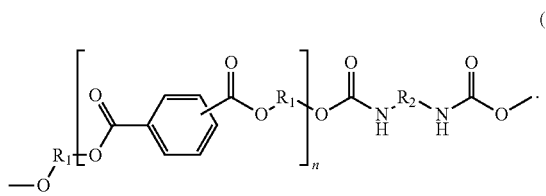

(II)

In Formula (II), each $R_1$ independently is an alkylene group having 2 to 8 carbon atoms or $CH_2CH_2OCH_2CH_2$; $R_2$ is

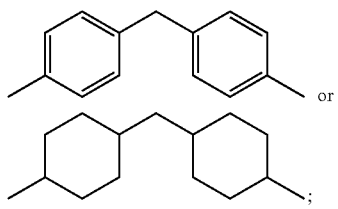

and n is a number from 2 to 13. In some embodiments, n may be an integer, but it is not limited.

That is, $R_1$ in Formula (II) corresponds to R in Formula (I), and "n" in Formula (II) is the same as "n" in Formula (I).

Preferably, the TPU has a Tg ranging from 10° C. to 40° C.; more preferably, the TPU has a Tg ranging from 15° C. and 28° C.

Preferably, the TPU may comprise a TPU of CAS No. 2484808-99-1, a TPU of CAS No. 2626937-63-9 or a combination thereof. Chemical Abstracts Service Number is abbreviated as CAS No.

It can be understood that the raw materials used to make the TPU comprising the structural unit represented by Formula (I) may be made from conventional raw materials, as long as the structural units derived therefrom can conform to the structural unit represented by Formula (I). In some embodiments, the TPU may be obtained by a condensation polymerization which uses a diol having the dicarboxyphenyl polyester structure represented by Formula (I) and a diisocyanate as raw materials. In some other embodiments, the TPU may be obtained by a condensation polymerization which uses a diol having the dicarboxyphenyl polyester structure represented by Formula (I), a chain extender and a diisocyanate as raw materials. In addition, the method of producing the TPU can adapt solvent-free one-shot synthesis method to undergo the condensation polymerization, or the TPU may be obtained by other methods such as described in the embodiments of TWI697512 B, but it is not limited thereto.

In accordance with the present disclosure, the structural unit represented by Formula (I) may be derived from a diol having the dicarboxyphenyl polyester structure. The diol with the dicarboxyphenyl polyester structure may be derived from a dicarboxyphenyl monomer and a diol monomer.

Preferably, the dicarboxyphenyl monomer may comprise 1,2-benzenedicarboxylic acid, 1,3-benzenedicarboxylic acid, 1,4-benzenedicarboxylic acid or phthalic anhydride.

Preferably, the diol monomer may comprise an aliphatic diol having 2 to 8 carbon atoms such as ethylene glycol, propylene glycol such as 1,2-propanediol and 1,3-propanediol, butanediol such as 1,4-butanediol, 2-methyl-1,3-propanediol, diethylene glycol, pentanediol, neopentyl glycol, hexanediol, 1,4-cyclohexanediol, triethylene glycol, 2-ethyl-1,3-hexanediol, octanediol or any combinations thereof.

Preferably, the diol having the dicarboxyphenyl polyester structure may be selected from a polyester polyol of 1,2-phthalic acid/diethylene glycol (CAS No. 25916-41-0, the chemical formula is $(C_8H_6O_4 \cdot C_4H_{10}O_3)x)$), a polyester polyol of phthalic anhydride/diethylene glycol (CAS No. 32472-85-8) such as a product "STEPANPOL® PD-56" of Stepan, a polyester polyol of 1,2-phthalates/diethylene glycol (CAS No. 25036-56-0, the chemical formula is $(C_{12}H_{12}O_5)x)$), a polyester polyol of 1,2-phthalic acid/1,6-hexanediol (CAS No. 27516-71-8, the chemical formula is $(C_8H_6O_4 \cdot C_6H_{14}O_2)x)$, a polyester polyol of phthalic anhydride/1,6-hexanediol (CAS No. 54797-78-3) such as a product "STEPANPOL® PH-56" of Stepan, and a polyester polyol of 1,2-phthalates/1,6-hexanediol (CAS No. 28725-71-5, the chemical formula is $(C_{14}H_{16}O_4)x)$).

Preferably, the diol having the dicarboxyphenyl polyester structure may have an OH value between 160.3 mg KOH/g and 56.1 mg KOH/g.

Preferably, the structural unit represented by Formula (I) may have a Mn ranging from 700 g/mole to 2000 g/mole.

In accordance with the present disclosure, the diisocyanate may comprise methylene diphenyl diisocyanate (MDI), 4,4'-methylenebis(cyclohexyl isocyanate) (HMDI) or a combination thereof, but it is not limited thereto. Preferably, the diisocyanate may be MDI.

In accordance with the present disclosure, the chain extender may be an aliphatic diol. Preferably, the aliphatic diol may be a diol having 2 to 8 carbon atoms, but it is not limited thereto. For example, the aliphatic diol may be ethylene glycol, propylene glycol, butanediol such as 1,4-butanediol, 2-methyl-1,3-propanediol, diethylene glycol, pentanediol, neopentyl glycol, hexanediol, 1,4-cyclohexanediol, triethylene glycol, 2-ethyl-1,3-hexanediol, octane diol or any combinations thereof, but it is not limited thereto. More preferably, the chain extender may be butanediol.

Preferably, a ratio of a sum of mole numbers of the diol having the dicarboxyphenyl polyester structure and the chain extender to a mole number of the diisocyanate may be from 0.95:1 to 1.10:1, but it is not limited thereto.

Preferably, the impact resistant layer is made only by the TPU. Therefore, it is beneficial for recycling or reusing the impact resistant layer from the waste products since the aforementioned impact resistant layer does not have any plasticizers or any impact-resistant additives.

Preferably, the impact resistant layer may have the thickness from 2 mm to 30 mm; more preferably, the impact resistant layer may have the thickness from 3.5 mm to 18 mm, but it is not limited thereto.

In some embodiments, a manufacturing method to form the impact resistant layer may comprise subjecting the TPU to a melt blown process. The TPU pellets were subjected to a melt blown process to form a nonwoven fabric, and the nonwoven fabric is cut to the required size, and several pieces of the nonwoven fabric can be stacked to a desired total thickness as needed, so as to form the impact resistant layer. Specifically, the relevant parameters in the melt blown process may be set dependent on the type of machine. For example, (1) using a single-line-spinneret meltblown machine at the feed inlet temperature ranging from 175° C. to 185° C., the nozzle temperature ranging from 225° C. to 235° C., and the die pressure ranging from 800 psi to 900 psi; or, (2) using a double-line-spinneret meltblown machine at the feed inlet temperature ranging from 110° C. to 120° C., the nozzle temperature ranging from 225° C. to 235° C., and the die pressure ranging from 2500 psi to 3000 psi. After the molten TPU is blown into fine fibers and collected on a rotary drum at a controlled speed, a single layer of the nonwoven fabric may have a thickness ranging from 0.5 mm to 4 mm, but it is not limited thereto; preferably, a single layer of the nonwoven fabric may have a thickness ranging from 1 mm to 3 mm. Preferably, the impact resistant layer obtained from the melt blown process may have a thickness of 6 mm or more; more preferably, the impact layer obtained from the melt blown process may have the thickness of 9.5 mm or more.

In other embodiments, the manufacturing method to form the impact resistant layer may comprise subjecting the TPU to a melt spinning process and then to a hot press process. That is, the TPU is to form fibers by a melt spinning, and the fibers are subjected to a hot press process to form the impact resistant layer. Specifically, the melt spinning process may be conducted with the relevant parameters set as follows: feeding the TPU pellets into the extrusion part with the setting temperature ranging from 170° C. to 210° C., the spinneret temperature ranging from 190° C. to 220° C., the diameter ratio (L/D ratio) of the spinneret being 0.64 mm/0.32 mm, the extension speed of the guide wheel ranging from 1400 meters per minute (m/min) to 2100 m/min. After the fibers are obtained, the fibers are subjected to a hot press process to form the impact resistant layer. Preferably, the impact resistant layer obtained from the melt spinning process and hot press process may have a thickness of 6 mm or more; more preferably, the impact layer obtained from the melt blown process and hot press process may have the thickness of 8.5 mm or more.

In addition, the impact resistant layer may be formed by 3D printing.

Preferably, when withstanding an impact force, the impact resistant layer may reduce 20% to 95% of the impact force. In some embodiments, the impact resistant layer may reduce 20%, 35%, 45%, 50%, 60%, 70% or 80% of the impact force, but it is not limited thereto.

Preferably, the impact resistant layer can achieve Level 1 of European Standard EN1621-1: 2012, which is for motorcyclists' protective clothing against mechanical impact. In the test conditions of EN1621-1: 2012, the test temperature is 23° C., and the impact energy is 50 joules (J). If the mean value of impact energy penetrating through the impact resistant layer remains below 35 kN and none of that of all single strikes is above 50 kN after the impact resistant layer is impacted, the impact resistant layer achieves Level 1 of EN1621-1: 2012.

Preferably, an impact resistance per unit thickness of the impact resistant layer may be 6.0%/mm or more. The "reduced impact $(F_s)$" is the difference obtained from substracting "penetrating impact $(F_t)$" from "original impact $(F_0)$" (i.e., $F_0-F_t$). A reduced impact ratio is the ratio of the "reduced impact $(F_s)$" to the "original impact $(F_0)$". Therefore, the impact resistance per unit thickness of the impact resistant layer is the ratio of the "reduced impact ratio" to the thickness of the impact resistant layer. More preferably, the impact resistance per unit thickness of the impact resistant layer may range from 6.5%/mm to 20%/mm.

The present disclosure also provides an impact resistant composite laminate. The impact resistant composite laminate comprises a base layer and a first impact resistant layer overlapping the base layer. The first impact resistant layer is formed by the aforementioned TPU comprising a structural unit represented by Formula (I), and the first impact resistant layer has a thickness of larger than 1.5 mm.

By overlapping the first impact resistant layer formed by the TPU comprising the structural unit represented by Formula (I) and the base layer, the impact resistant composite laminate can reduce at least 20% of the impact force. When the impact resistant composite laminate is widely used to various protective products, it not only provides a good impact resistance but also satisfies the needs in appearance through the selection of the base layer.

In some embodiments, the first impact resistant layer may overlap the base layer in a physical manner such as by directly stacking, inlaying, filling or any combinations thereof, but it is not limited thereto. In other embodiments, the first impact resistant layer may bond to the base layer by a hot pressing process after overlapping each other. In still other embodiments, the first impact resistant layer and the base layer may be adhered by any conventional adhesive method, but it is not limited thereto.

Preferably, the base layer may comprise a rigid plastic layer, a leather, a foam elastomer, a woven fabric, a knit fabric, a nonwoven fabric, a fiberglass layer or any combinations thereof, but it is not limited thereto.

For example, the material of the rigid plastic layer may comprise polyethene (PE), polypropylene (PP), polyethylene terephthalate (PET) or polycarbonate (PC). Preferably, the rigid plastic layer may have a Shore hardness ranging from 50 D to 90 D, but it is not limited thereto.

The material of the foam elastomer may comprise PU, thermoplastic polyolefin (TPO), ethylene-vinyl acetate (EVA), polystyrene (PS, also called styrofoam), or thermoplastic vulcanizate (TPV) comprising ethylene propylene diene monomer (EPDM).

The material of a woven fabric, a knit fabric or a nonwoven fabric may comprise thermoplastic resins, but it is not limited thereto. For example, the thermoplastic resins may be polyester, Nylon, TPO, TPU or any combinations thereof, but it is not limited thereto.

The fiberglass layer may be composed of only glass fibers, or composed of a composite material having glass fibers. For example, the composite material having glass fibers may comprise glass fibers and reinforced plastics such as a moisture-curable polyurethane resin (PUR), but it is not limited thereto.

When the base layer is a rigid plastic layer, preferably, the base layer may have a thickness ranging from 1.8 mm to 10 mm.

When the base layer is a foam elastomer, preferably, the base layer may have a thickness ranging from 2 mm to 18 mm.

When the base layer is a woven fabric, a knit fabric or a nonwoven fabric, preferably, the base layer may have a thickness ranging from 0.1 mm to 4 mm.

When the base layer is a fiberglass layer, preferably, the base layer may have a thickness ranging from 1 mm to 7 mm.

When the base layer is a rigid plastic layer, preferably, the first impact resistant layer may have a thickness ranging from 2 mm to 10 mm, but it is not limited thereto.

When the base layer is a foam elastomer, preferably, the first impact resistant layer may have a thickness ranging from 2 mm to 10 mm, but it is not limited thereto.

When the base layer is a woven fabric, a knit fabric or a nonwoven fabric, preferably, the first impact resistant layer may have a thickness ranging from 2 mm to 16 mm, but it is not limited thereto.

When the base layer is a fiberglass layer, preferably, the first impact resistant layer may have a thickness ranging from 2 mm to 10 mm, but it is not limited thereto.

In some embodiments, the impact resistant composite laminate may further comprise a surface layer, and the first impact resistant layer may be disposed between the surface layer and the base layer.

Preferably, the surface layer may comprise a rigid plastic layer, a foam elastomer, a woven fabric, a knit fabric, a nonwoven fabric, a fiberglass layer or any combinations thereof, but it is not limited thereto. The surface layer is similar to the aforementioned base layer in composition, preparing method or thickness, so the surface layer can be provided by referring to the base layer.

In some embodiments, the impact resistant composite laminate may further comprise a second impact resistant layer, and the base layer may be disposed between the first impact resistant layer and the second impact resistant layer. The second impact resistant layer has a thickness of larger than 1.5 mm.

The second impact resistant layer is formed by the aforementioned TPU comprising a structural unit represented by Formula (I). That is, the first impact resistant layer and the second impact resistant layer may be the same or not. When the first impact resistant layer and the second impact resistant layer are different, the first impact resistant layer and the second impact resistant layer may adapt the same TPU but using different manufacturing methods; or, the first impact resistant layer and the second impact resistant layer may adapt the same TPU and the same manufacturing method but they have different thicknesses.

In some embodiments, the impact resistant composite laminate may comprise the surface layer, the first impact resistant layer, the base layer and the second impact resistant layer sequentially.

Preferably, when the impact resistant composite laminate withstands an impact force, the first impact resistant layer of the impact resistant composite laminate may reduce 20% to 95% of the impact force.

In some embodiments, when the impact resistant composite laminate withstands an impact force, the first impact resistant layer of the impact resistant composite laminate may reduce 20%, 30%, 40%, 50%, 60%, 70%, 80%, 85% or 90% of the impact force, but it is not limited thereto.

Preferably, when the impact resistant composite laminate withstands an impact force, the impact resistant composite laminate may reduce 20% to 99% of the impact force.

In some embodiments, when the impact resistant composite laminate withstands an impact force, the impact resistant composite laminate may reduce 35%, 40%, 50%, 60%, 70%, 80%, 85%, 90% or 95% of the impact force, but it is not limited thereto.

Preferably, the impact resistant composite laminate can achieve Level 1 of European Standard EN1621-1: 2012, which is for motorcyclists' protective clothing against mechanical impact.

More preferably, the impact resistant composite laminate can achieve Level 2 of European Standard EN1621-1: 2012. In the test conditions of EN1621-1: 2012, the test temperature is 23° C., and the impact energy is 50 J. If the mean value of impact energy penetrating through the impact resistant composite laminate remains below 20 kN and none of that of all single strikes is above 30 kN after the impact resistant composite laminate is impacted, the impact resistant composite laminate will achieve Level 2 of EN1621-1: 2012.

In some embodiments, the impact resistant composite laminate may be placed in an outer covering such as a bag. For example, the material of the outer covering may be a woven fabric, a knit fabric or a nonwoven fabric, but it is not limited thereto. The outer covering may entirely cover the impact resistant composite laminate, or the outer covering may partially cover the impact resistant composite laminate; for example, the aforementioned outer covering may have a hollow-out design.

In other embodiments, the impact resistant composite laminate may be used with at least one connecting element such as a bonding belt, a pair of hook-and-loop fasteners and a pair of buckles, but it is not limited thereto.

In some embodiments, the impact resistant composite laminate may be used for applications of grips of goods, personal protective equipment, machinery safety equipment or medical protective equipment, but it is not limited thereto.

Specifically, the personal protective equipment may comprise helmet linings, glove linings, anti-fall clothing, bandages, sleeves, footwear reinforcements such as reinforcements of upper linings, tongue linings, toe cap linings, heel counter linings, insoles and midsoles, or protective equipment for work and sports such as impact protective gear, impact gloves, anti-shock pads, anti-fall pads and shock absorbing pads.

Other objectives, advantages and novel features of the disclosure will become more apparent from the following detailed description when taken in conjunction with the accompanying drawings.

DETAILED DESCRIPTION OF THE PREFERRED EMBODIMENTS

Figure 1:
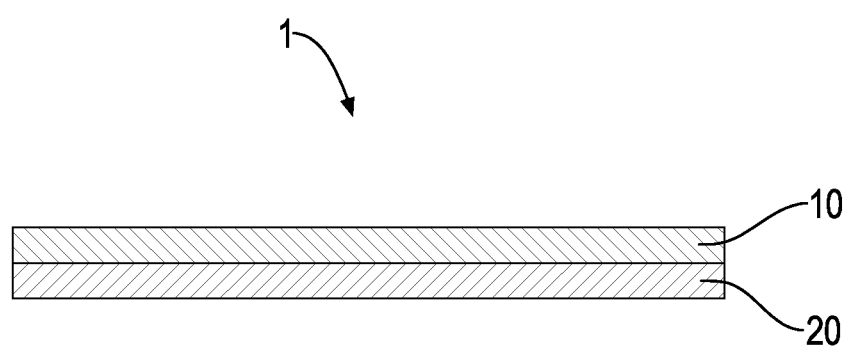
FIG. 1 is a schematic side sectional view of one embodiment of an impact resistant composite laminate in accordance with the present disclosure.

Hereinafter, one skilled in the arts can easily realize the advantages and effects of the present disclosure from the following examples and comparative examples. Therefore, it should be understood that the descriptions proposed herein are just preferable examples for the purpose of illustrations only, not intended to limit the scope of the disclosure. Various modifications and variations could be made in order to practice or apply the present disclosure without departing from the spirit and scope of the disclosure.

Thermoplastic Polyurethane

TPU-0

TPU-0 comprising a structural unit represented by the Formula (I) could be prepared from the synthetic method recorded in TWI697512B or other conventional synthetic methods. The CAS No. and the chemical formula of TPU-0 were listed as follows.

1. CAS No.: 2484808-99-1;
2. Chemical Formula: $(C_{15}H_{10}N_2O_2 \cdot C_8H_6O_4 \cdot C_4H_{10}O_3 \cdot C_4H_{10}O_2)x$.

In other embodiments, the TPU used to form the resistant impact layer may choose other TPU comprising the structural unit represented by Formula (I), for example, the TPU of CAS No. 2626937-63-9, but it is not limited thereto.

Preparation Method of Impact Resistant Layer

In order to demonstrate the TPU comprising a structural unit represented by Formula (I) can be used to form an impact resistant layer with a good impact resistance, each example of impact resistant layers of the present disclosure was made from the aforementioned TPU only, without adding any stabilizers and additives.

Preparation Method I: Melt Blown Method

TPU-0 was subjected to a pelletizing process to obtain TPU-0 pellets. Then, the TPU-0 pellets were transferred to a single-line-spinneret meltblown machine to undergo a melt blown process, and finally, a single layer of the melt-blown blown nonwoven fabric was collected by a roller at room temperature. The single layer of the melt-blown nonwoven fabric had a thickness of about 2 mm. The concerned manufacturing parameters were listed below.

(1) feed inlet temperature: 175° C. to 185° C.;
(2) nozzle temperature: 225° C. to 235° C.;
(3) die pressure: 800 psi to 900 psi.

The examples of the impact resistant layer were respectively formed as follows: the aforementioned melt-blown nonwoven fabric was cut into several pieces (each piece called TPU-MB) of a specific size (110 mm in length, 100 mm in width), and then the examples of the impact resistant layer were obtained by stacking multiple layers of TPU-MB to a predetermined thickness. For example, in the case that the thickness of the impact resistant layer containing TPU-MB is 4 mm, it would be formed by stacking two layers of TPU-MB.

In addition, the TPU-MB was measured by a Gel permeation chromatography (GPC) to analyze the Mn, the weight average molecular weight (Mw) and the peak molecular weight (Mp), and the TPU-MB was measured by a Differential Scanning Calorimetry (DSC) to analyze the Tg.

1. Mn: 17185;
2. Mw: 37876;
3. Mp: 38995;
4. Tg: 21.84° C.

The impact resistant layers of Example 1 to Example 4 (E1 to E4), Example 10 to Example 14 (E10 to E14) and Example 15 to Example 16 (E15 to E16) were made by the melt blown method (i.e. Preparation Method I).

The difference between the impact resistant layers of E1 to E4 was only in the respective thickness of the impact resistant layers.

The difference between the impact resistant layers of E10 to E14 was only in the respective thickness of the impact resistant layers.

The difference between the impact resistant layers of E15 and E16 was only in the respective thickness of the impact resistant layers.

Preparation Method II: Melt Spinning-Hot Press Method

TPU-0 was subjected to a pelletizing process to obtain TPU-0 pellets. Then, the TPU-0 pellets were fed into a melt spinning machine to undergo a melt spinning process, and finally, a bundle of fibers was put out. After that, the aforementioned fibers were subjected to a hot press process and then to a cooling step to form one single layer of a spunbond nonwoven fabric which had a thickness of about 2 mm. The concerned manufacturing parameters were listed below.

(1) temperature of extrusion part: 170° C. to 210° C.;
(2) spinneret temperature: 190° C. to 220° C.;
(3) L/D ratio of the spinneret: 0.64 mm/0.32 mm;
(4) extension speed of the guide wheel: 1400 m/min to 2100 m/min;
(5) temperature of hot press: 120° C.;
(6) pressure of hot press: 10 kg/cm$^2$;
(7) duration of hot press: 3 min.

The examples of the impact resistant layer were respectively formed as follows: the aforementioned spunbond nonwoven fabric was cut into several pieces (each piece called TPU-H) of a specific size (110 mm in length, 100 mm in width), and then the examples of the impact resistant layer were obtained by stacking multiple layers of TPU-H to a predetermined thickness. For example, in the case that the thickness of the impact resistant layer containing TPU-H is 4 mm, it would be formed by stacking two layers of TPU-H.

In addition, the TPU-H was measured by the GPC to analyze the Mn, the Mw and the Mp, and the TPU-H was measured by a DSC to analyze the Tg.

1. Mn: 31093;
2. Mw: 69508;
3. Mp: 69897;
4. Tg: 26.25° C.

The impact resistant layers of Example 5 to Example 9 (E5 to E9) were made by the melt spinning-hot press method (i.e. Preparation Method II).

The difference between the impact resistant layers of E5 to E9 was only in the respective thickness of the impact resistant layers.

Comparative Example 1 (C1), Comparative Example 2 (C2), Comparative Example 7 (C7) to Comparative Example 9 (C9), Comparative Example 10 (C10) and Comparative Example 11 (C11) were respectively a melt-blown nonwoven fabric made from an ester based TPU; wherein the ester based TPU was Kuotane 300 purchased from Sunko Ink Co., Ltd. Kuotane 300 had a Shore hardness of 90 A and a Tg of –47.57° C. (obtained from DSC).

The impact resistant layers of Comparative Example 4 (C4) to Comparative Example 6 (C6) were prepared by the aforementioned Preparation Method I, so the major difference between E1 and C4 to C6 was the thickness. The impact resistant layers of C4 to C6 respectively had a thickness smaller than 1.5 mm.

Comparative Example 3 (C3) was a nonwoven fabric made from an ester based TPU by the melt spinning-hot press method; wherein the ester based TPU was T7681BVM purchased from Sunko Ink Co., Ltd. T7681BVM had a Shore hardness of 68 D and a Tg of –4.23° C. (obtained from DSC).

Test 1: Impact Resistance Performance Test

In Tables 1 to 3, the impact resistant layers of Examples and Comparative Examples were respectively analyzed by a shock tester (DP-1200 of KING DESIGN INDUSTRIAL) under a specific test condition, and the resulting "penetrating impact ($F_t$)", "reduced impact ($F_s$)", a reduced impact ratio and the impact resistance per unit thickness of the impact resistant layer were listed in Tables 1 to 3.

The test conditions used in this test were respectively Test Conditions A to C listed as follows:

1. Test Condition A: a standard weight of 5.0 kg hammer was dropped freely at a height of 1.0 m to hit against test samples vertically, so the potential energy provided by the hammer was about 50 J;
2. Test Condition B: a standard weight of 5.0 kg hammer was dropped freely at a height of 0.5 m to hit against test samples vertically, so the potential energy provided by the hammer was about 25 J;
3. Test Condition C: a standard weight of 5.0 kg hammer was dropped freely at a height of 0.25 m to hit against test samples vertically, so the potential energy provided by the hammer was about 12.5 J.

The "Blank" test refers to an impact force measured by a free drop of the hammer under a specific test condition to directly hit the platform of the shock tester without any test samples thereon; the impact force measured by Blank test could be also called the "original impact ($F_0$)".

The "penetrating impact ($F_t$)" refers to an impact force penetrating through the test sample, measured by a free drop of the hammer under a specific test condition to hit a test sample on the platform of the shock tester.

The "reduced impact ($F_s$)" refers to the impact force that the test sample dissipates when withstanding an external force under the specific test condition. $F_s$ is the difference obtained from $F_0$ minus $F_t$.

The "reduced impact ratio" is a ratio of the "reduced impact ($F_s$)" to the "original impact ($F_0$)"; that is, "reduced impact ratio"=$F_s/F_0$.

The "impact resistance per unit thickness" is a ratio of the "reduced impact ratio" to the thickness of the impact resistant layer; that is, "impact resistance per unit thickness"= ($F_s/F_0$)/thickness.

E1 to E9 and C1 to C3 were all tested for impact resistance under Test Condition A at room temperature (25° C.±2° C.), and the results were listed in Table 1.

TABLE 1

| | Preparation Method | Thickness (mm) | Time domain (mS) | $F_t$(kN) | $F_s$ (kN) | $F_s/F_0$ | Impact resistance per unit thickness (%/mm) |
|---|---|---|---|---|---|---|---|
| Blank | — | — | 0.7 | 96.35 | — | — | — |
| E1 | I | 4.02 | 1.09 | 70.50 | 25.85 | 26.8% | 6.67 |
| E2 | I | 6.09 | 1.63 | 52.14 | 44.21 | 45.9% | 7.53 |
| E3 | I | 7.95 | 1.99 | 43.65 | 52.70 | 54.7% | 6.88 |
| E4 | I | 10.85 | 3.25 | 27.88 | 68.47 | 71.1% | 6.55 |
| C1 | — | 4.16 | 0.98 | 74.02 | 22.33 | 23.2% | 5.57 |
| C2 | — | 8.10 | 1.68 | 67.03 | 29.32 | 30.4% | 3.76 |
| E5 | II | 1.97 | 0.90 | 75.80 | 20.55 | 21.3% | 10.83 |
| E6 | II | 3.75 | 1.18 | 63.01 | 33.34 | 34.6% | 9.23 |
| E7 | II | 5.70 | 1.71 | 48.08 | 48.27 | 50.1% | 8.79 |
| E8 | II | 7.42 | 2.02 | 38.52 | 57.83 | 60.0% | 8.09 |
| E9 | II | 10.55 | 2.65 | 29.10 | 67.25 | 69.8% | 6.62 |
| C3 | — | 4.01 | 0.99 | 75.58 | 20.77 | 21.6% | 5.38 |

E10 to E14 and C4 to C9 were all tested for impact resistance under Test Condition B at room temperature (25° C.±2° C.), and the results were listed in Table 2.

TABLE 2

| | Preparation Method | Thickness (mm) | Time domain (mS) | $F_t$(kN) | $F_s$ (kN) | $F_s/F_0$ | Impact resistance per unit thickness (%/mm) |
|---|---|---|---|---|---|---|---|
| Blank | — | — | 0.67 | 60.99 | — | — | — |
| E10 | I | 1.96 | 1.03 | 44.50 | 16.49 | 27.0% | 13.79 |
| E11 | I | 4.03 | 2.01 | 28.37 | 32.62 | 53.5% | 13.27 |
| E12 | I | 6.09 | 2.64 | 21.12 | 39.87 | 65.4% | 10.73 |
| E13 | I | 8.84 | 4.14 | 16.61 | 44.38 | 72.8% | 8.23 |
| E14 | I | 10.80 | 4.75 | 13.86 | 47.13 | 77.3% | 7.16 |
| C4 | I | 0.20 | 0.70 | 58.23 | 2.76 | 4.5% | 22.63 |
| C5 | I | 0.53 | 0.71 | 57.14 | 3.85 | 6.3% | 11.91 |
| C6 | I | 1.22 | 0.81 | 51.58 | 9.41 | 15.4% | 12.65 |
| C7 | — | 2.15 | 0.86 | 52.16 | 8.83 | 14.5% | 6.73 |
| C8 | — | 4.11 | 1.12 | 46.75 | 14.24 | 23.3% | 5.68 |
| C9 | — | 8.08 | 2.16 | 34.80 | 26.19 | 42.9% | 5.31 |

E15, E16 and C10 and C11 were all tested for impact resistance under Test Condition C at room temperature (25° C.±2° C.), and the results were listed in Table 3.

TABLE 3

| | Preparation Method | Thickness (mm) | Time domain (mS) | $F_t$(kN) | $F_s$ (kN) | $F_s/F_0$ | Impact resistance per unit thickness (%/mm) |
|---|---|---|---|---|---|---|---|
| Blank | — | — | 1.06 | 28.00 | — | — | — |
| E15 | I | 4.46 | 3.06 | 11.26 | 16.74 | 59.8% | 13.40 |

TABLE 3-continued

|  | Preparation Method | Thickness (mm) | Time domain (mS) | $F_t$ (kN) | $F_s$ (kN) | $F_s/F_0$ | Impact resistance per unit thickness (%/mm) |
|---|---|---|---|---|---|---|---|
| E16 | I | 8.50 | 5.43 | 6.90 | 21.10 | 75.4% | 8.87 |
| C10 | — | 4.30 | 2.32 | 19.76 | 8.24 | 29.4% | 6.84 |
| C11 | — | 8.35 | 5.00 | 10.87 | 17.13 | 61.2% | 7.33 |

All of the impact resistant layers of Example 11-2 (E11-2), Example 11-3 (E11-3) and Example 11-4 (E11-4) were the same as the impact resistant layer of E11; however, the impact resistant layers of E11-2 to E11-4 were tested for impact resistance under Test Condition B at different temperatures rather than room temperature and the results were listed in Table 4.

TABLE 4

|  | Test Temp. | Thickness (mm) | Time domain (mS) | $F_t$ (kN) | $F_s$ (kN) | $F_s/F_0$ | Impact resistance per unit thickness (%/mm) |
|---|---|---|---|---|---|---|---|
| Blank | 25° C. | — | 0.67 | 60.99 | — | — | — |
| E11 | 25° C. | 4.03 | 2.01 | 28.37 | 32.62 | 53.5% | 13.28 |
| E11-2 | −18° C. | 4.08 | 2.07 | 27.11 | 33.88 | 55.6% | 13.63 |
| E11-3 | 5° C. | 3.91 | 2.65 | 27.42 | 33.57 | 55.0% | 14.08 |
| E11-4 | 50° C. | 4.21 | 2.01 | 28.96 | 32.03 | 52.5% | 12.47 |

Discussion on Impact Resistance of Impact Resistant Layers Formed by the TPU

From the results in Tables 1 to 3, no matter the E1 to E4 under the Test Condition A, the E10 to E14 under the Test Condition B or the E15 and E16 under the Test Condition C, the impact resistant layers, which were prepared by a melt blown process using the TPU comprising the structural unit represented by the Formula (I), indeed reduced at least 20% of the external impact. Similarly, the impact resistant layers, which were prepared by a melt spun process and then a hot press process using the TPU comprising the structural unit represented by the Formula (I), also reduced at least 20% of the external impact.

Further, from the test results of C4 to C6, it can be seen that the resistant layers must have a thickness of above 1.5 mm to have sufficient impact resistance.

Accordingly, the layer with a specific thickness, which is formed by the TPU comprising the structural unit represented by the Formula (I) of the present disclosure, can have a good impact resistance to cushion external force effectively.

In addition, in the cases of having the same or similar thickness, for example, a comparison between E1 and C1 in Table 1, a comparison of E2 and C2 in Table 1, a comparison of E6 and C3 in Table 1, a comparison between E10 and C7 in Table 2, a comparison between E11 and C8 in Table 2, a comparison between E15 and C10 in Table 3, and a comparison between E16 and C11 in Table 3, the impact resistant layers formed by the TPU comprising the structural unit represented by the Formula (I) had a better impact resistance than the impact resistant layers formed by other materials without the TPU having the structural unit represented by the Formula (I).

Furthermore, as C1 and C2 shown in Table 1, for the impact resistant layers formed by other TPU without the structural unit represented by the Formula (I), the impact resistance per unit thickness significantly decreased as the thickness increased. Nevertheless, for the impact resistant layers of E1 and E3 in Table 1, their impact resistance per unit thickness remained even when the thickness increased.

Moreover, from the experiment results in Table 4, the same impact resistant layer could reduce a considerable degree of the external impact no matter in a low or high temperature environment. It can prove that the impact resistant layer formed by the TPU comprising the structural unit represented by the Formula (I) indeed has an impact resistance not restricted by the Tg of the TPU.

Impact Resistant Composite Laminate

Please refer to the impact resistant composite laminate 1 in FIG. 1, one embodiment of the impact resistant composite laminate of the present disclosure which may have a double-layer structure. Specifically, the impact resistant composite laminate 1 has a base layer 20 and a first impact resistant layer 10 disposed on the base layer 20.

Figure 2:
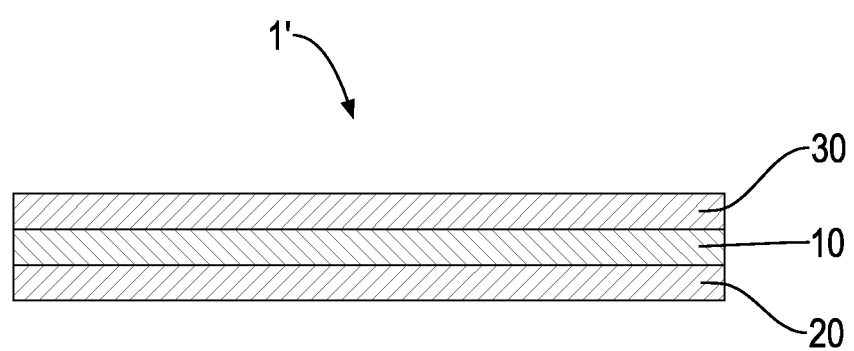
FIG. 2 is a schematic side sectional view of another embodiment of an impact resistant composite laminate in accordance with the present disclosure.

Please refer to the impact resistant composite laminate 1' in FIG. 2, another one embodiment of the impact resistant composite laminate of the present disclosure which may have a three-layer structure. Specifically, the impact resistant composite laminate 1' has a base layer 20, a first impact resistant layer 10 disposed on the base layer 20, and a surface layer 30 disposed on the first impact resistant layer 10. That is, the first impact resistant layer 10 is sandwiched between the surface layer 30 and the base layer 10.

Figure 3:
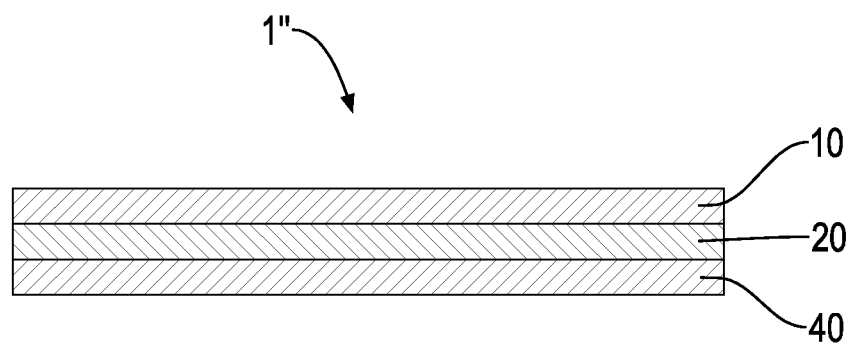
FIG. 3 is a schematic side sectional view of still another embodiment of an impact resistant composite laminate in accordance with the present disclosure.

Referring to the impact resistant composite laminate 1" in FIG. 3, another embodiment of the impact resistant composite laminate of the present disclosure may have a three-layer structure. Specifically, the impact resistant composite laminate 1" has a first impact resistant layer 10, a base layer 20, and a second impact resistant layer 40. That is, the base layer 20 is sandwiched between the first impact resistant layer 10 and the second impact resistant layer 40.

Each of the first impact resistant layers in Table 5 was formed by Preparation Method I adapting TPU-0, and the first resistant layer was also called resistant layer for convenience.

The Examples 17 and 18 (E17 and E18) were respectively obtained by stacking a PP woven fabric with a thickness of 1.76 mm on the impact resistant layer.

The Example 19 (E19) was obtained by stacking a PET woven fabric with a thickness of 2.42 mm on the impact resistant layer with a thickness of 8.42 mm.

The Comparative Example 12 (C12) was a PP woven fabric with a total thickness of 9.95 mm.

The Comparative Example 13 (C13) was a PET woven fabric with a total thickness of 10.16 mm.

E17 to E19 and C12 to C13 were all tested for impact resistance under Test Condition A at room temperature (25° C.±2° C.), and the results were listed in Table 5. In the test for impact resistance, the hammer contacted the outer surface of the base layer (i.e. the surface opposite to the surface contacting the impact resistant layer) when falling.

TABLE 5

| | Thickness (mm) | | | Time domain (mS) | $F_t$ (kN) | $F_s$ (kN) | $F_s/F_0$ |
|---|---|---|---|---|---|---|---|
| | Base layer | First impact resistant layer | Total | | | | |
| Blank | — | — | — | 0.7 | 96.35 | — | — |
| E17 | 1.76 | 7.22 | 8.98 | 2.11 | 41.63 | 54.72 | 56.8% |
| E18 | 1.76 | 10.19 | 11.95 | 3.96 | 28.51 | 67.84 | 70.4% |
| E19 | 2.42 | 8.42 | 10.84 | 2.31 | 39.30 | 57.1 | 59.2% |
| C12 | 9.95 | — | 9.95 | 1.02 | 79.98 | 16.37 | 17.0% |
| C13 | 10.16 | — | 10.16 | 1.09 | 70.50 | 25.85 | 26.8% |

In Table 6, the first impact resistant layers of Examples 20 and 21 (E20 and E21) were formed by Preparation Method I adapting TPU-0; and the first impact resistant layer of Examples 22 and 23 (E22 and E23) were formed by Preparation Method II adapting TPU-0.

The E20 was obtained by stacking a Nylon fabric with a thickness of 0.11 mm on the first impact resistant layer with a thickness of 2.06 mm.

The E21 was obtained by stacking a Nylon fabric with a thickness of 0.11 mm on the first impact resistant layer with a thickness of 3.89 mm.

The E22 was obtained by stacking a Nylon fabric with a thickness of 0.11 mm on the first impact resistant layer with a thickness of 1.9 mm.

The E23 was obtained by stacking a Nylon fabric with a thickness of 0.11 mm on the first impact resistant layer with a thickness of 3.83 mm.

The Comparative Example 14 (C14) was obtained by stacking a Nylon fabric with a thickness of 0.11 mm on a melt-blown nonwoven fabric made by Kuotane 300 with a thickness of 4.04 mm.

The Comparative Example 15 (C15) was obtained by stacking a Nylon fabric with a thickness of 0.11 mm on a spunbond nonwoven fabric of TPE-01 with a thickness of 4.19 mm; TPE-01 was made by an ester based TPU "T7681BVM" purchased from Sunko Ink Co., Ltd. T7681BVM had a Shore hardness of 68 D and a Tg of −4.23° C. (obtained from DSC).

The Reference Example 1 (R1) was the Nylon fabric with a thickness of 0.11 mm.

R1, E20 to E23 and C14 to C15 were all tested for impact resistance under Test Condition C at room temperature (25° C.±2° C.), and the results were listed in Table 6. In the test for impact resistance, the hammer contacted the outer surface of the base layer (i.e. the surface opposite to the surface contacting the impact resistant layer) when falling.

The "Blank" test refers to an impact force measured by a free drop of the hammer under a specific test condition to directly hit the platform of the shock tester without any test samples thereon; the impact force measured by Blank test could also be called the "original impact ($F_0$)".

The "penetrating impact ($F_t$)" refers to a measured impact force, which is a free drop of the hammer under a specific test condition to hit a test sample on the platform of the shock tester.

The "reference impact ($F_0'$)" refers to an impact force penetrating through the test sample, measured by a free drop of the hammer under a specific test condition to hit a reference sample (the base layer of the impact resistant composite laminate of Examples) on the platform of the shock tester.

The "reduced impact of the impact resistant layer ($F_s'$)" refers to the impact force that the impact resistant layer of the test sample dissipates when withstanding an external force under the specific test condition. $F_s'$ is the difference obtained from substracting "penetrating impact ($F_t$)" from "reference impact ($F_0'$)".

The "reduced impact ratio of the impact resistant layer" is a ratio of the "reduced impact of the impact resistant layer ($F_s'$)" to the "reference impact ($F_0'$)"; that is, "reduced impact ratio of the impact resistant layer"=$F_s'/F_0'$.

The "impact resistance per unit thickness of the impact resistant layer" was a ratio of the "reduced impact ratio of the impact resistant layer" to the thickness of the (first) impact resistant layer; that is, "impact resistance per unit thickness of the impact resistant layer"=($F_s'/F_0'$)/thickness.

TABLE 6

| | Thickness (mm) | | Time domain (mS) | $F_t$ (kN) | $F_s'$ (kN) | $F_s'/F_0'$ | ($F_s'/F_0'$)/ thickness (%/mm) |
|---|---|---|---|---|---|---|---|
| | Base layer | First impact resistant layer | | | | | |
| Blank | — | — | 1.06 | 28.00 | — | — | — |
| R1 | 0.11 | — | 1.11 | 25.73 | — | — | — |
| E20 | 0.11 | 2.06 | 2.20 | 17.96 | 7.77 | 30.2% | 14.66 |
| E21 | 0.11 | 3.89 | 2.71 | 12.28 | 13.45 | 52.3% | 13.44 |
| C14 | 0.11 | 4.04 | 2.29 | 20.1 | 5.63 | 21.9% | 5.42 |
| E22 | 0.11 | 1.9 | 1.88 | 19.08 | 6.65 | 25.8% | 13.60 |
| E23 | 0.11 | 3.83 | 2.33 | 13.63 | 12.10 | 47.0% | 12.28 |
| C15 | 0.11 | 4.19 | 2.62 | 15.99 | 9.74 | 37.9% | 9.03 |

In Table 7, the first impact resistant layers of Examples 24 to 29 (E24 to E29) were formed by Preparation Method I adapting TPU-0.

The E24 was obtained by stacking a cotton cloth with a thickness of 0.67 mm on the first impact resistant layer with a thickness of 1.98 mm.

The E25 was obtained by stacking a cotton cloth with a thickness of 0.67 mm on the first impact resistant layer with a thickness of 4.4 mm.

The E26 was obtained by stacking a leather with a thickness of 0.86 mm on the first impact resistant layer with a thickness of 1.8 mm.

The E27 was obtained by stacking a leather with a thickness of 0.86 mm on the first impact resistant layer with a thickness of 4.07 mm.

The E28 was obtained by stacking a cotton working glove with a thickness of 3.74 mm on the first impact resistant layer with a thickness of 2.31 mm.

The E29 was obtained by stacking a cotton working glove with a thickness of 3.74 mm on the first impact resistant layer with a thickness of 4.07 mm.

The Reference Example 2 (R2) was the cotton cloth with a thickness of 0.67 mm.

The Reference Example 3 (R3) was the leather with a thickness of 0.86 mm.

The Reference Example 4 (R4) was the cotton working glove with a thickness of 3.74 mm.

R2 to R4 and E24 to E29 were all tested for impact resistance under Test Condition C at room temperature (25°

C.±2° C.), and the results were listed in Table 7. In the test for impact resistance, the hammer contacted the outer surface of the base layer (i.e. the surface opposite to the surface contacting the impact resistant layer) when falling.

TABLE 7

| | Thickness (mm) | | | | | |
|---|---|---|---|---|---|---|
| | Base layer | First impact resistant layer | Time domain (mS) | $F_t$ (kN) | $F_s'$ (kN) | $F_s'/F_0'$ | $(F_s'/F_0')/$ thickness (%/mm) |
| R2 | 0.67 | — | 1.40 | 25.76 | — | — | — |
| E24 | 0.67 | 1.98 | 2.10 | 17.80 | 7.96 | 30.9% | 15.61 |
| E25 | 0.67 | 4.4 | 3.12 | 10.90 | 14.86 | 57.7% | 13.11 |
| R3 | 0.86 | — | 1.44 | 23.62 | — | — | — |
| E26 | 0.86 | 1.8 | 2.11 | 16.63 | 6.99 | 29.6% | 16.44 |
| E27 | 0.86 | 4.07 | 3.06 | 10.42 | 13.20 | 55.9% | 13.73 |
| R4 | 3.74 | — | 1.76 | 22.24 | — | — | — |
| E28 | 3.74 | 2.31 | 4.16 | 12.06 | 10.18 | 45.8% | 19.82 |
| E29 | 3.74 | 4.07 | 5.82 | 7.80 | 14.44 | 64.9% | 15.95 |

In Table 8, the first impact resistant layers of Examples 30 to 33 (E30 to E33) were formed by Preparation Method I adapting TPU-0.

The Reference Example 5 (R5) was a PE rigid plastic layer with a thickness of 1.97 mm and a Shore hardness of 60 D; the PE rigid plastic layer was formed by hot pressing the PE resin of HDPE 7501 purchased from Formosa Plastics Co., Ltd.

The E30 was obtained by stacking the aforesaid PE rigid plastic layer on the first impact resistant layer with a thickness of 2.04 mm.

The E31 was obtained by stacking the aforesaid PE rigid plastic layer on the first impact resistant layer with a thickness of 3.8 mm.

The Reference Example 6 (R6) was a TPV rigid plastic layer with a thickness of 2.3 mm and a Shore hardness of 50 D; the TPV rigid plastic layer was formed by injection molding the TPV resin of 500B50D purchased from Sunko Ink Co., Ltd.; wherein 500B50D is a polymer elastomer material in which highly vulcanized EPDM microparticles were dispersed in a continuous PP phase.

The E32 was obtained by stacking the aforesaid TPV rigid plastic layer on the first impact resistant layer with a thickness of 2.03 mm.

The E33 was obtained by stacking the aforesaid TPV rigid plastic layer on the first impact resistant layer with a thickness of 3.6 mm.

R5, R6 and E30 to E33 were all tested for impact resistance under Test Condition B at room temperature (25° C.±2° C.), and the results were listed in Table 8. In the test for impact resistance, the hammer contacted the outer surface of the base layer (i.e. the surface opposite to the surface contacting the impact resistant layer) when falling.

TABLE 8

| | Thickness (mm) | | | | | | |
|---|---|---|---|---|---|---|---|
| | Base layer | First impact resistant layer | Time domain (mS) | $F_t$ (kN) | $F_s'$ (kN) | $F_s'/F_0'$ | $(F_s'/F_0')/$ thickness (%/mm) |
| Blank | — | — | 0.67 | 60.99 | — | — | — |
| R5 | 1.97 | — | 0.76 | 56.80 | — | — | — |
| E30 | 1.97 | 2.04 | 1.30 | 40.26 | 16.54 | 29.1% | 14.27 |
| E31 | 1.97 | 3.8 | 2.34 | 24.90 | 31.90 | 56.2% | 14.78 |

TABLE 8-continued

| | Thickness (mm) | | | | | | |
|---|---|---|---|---|---|---|---|
| | Base layer | First impact resistant layer | Time domain (mS) | $F_t$ (kN) | $F_s'$ (kN) | $F_s'/F_0'$ | $(F_s'/F_0')/$ thickness (%/mm) |
| R6 | 2.3 | — | 0.82 | 55.68 | — | — | — |
| E32 | 2.3 | 2.03 | 1.44 | 37.52 | 18.16 | 32.6% | 16.07 |
| E33 | 2.3 | 3.6 | 2.02 | 28.96 | 26.72 | 48.0% | 13.33 |

In Table 9, the first impact resistant layers of Examples 34 and 35 (E34 and E35) were formed by Preparation Method I adapting TPU-0.

The Reference Example 7 (R7) was a fiberglass layer with a thickness of 2.82 mm; the fiberglass layer was a glass fiber prepreg with a moisture-cured reactive PUR.

The E34 was obtained by stacking the aforesaid fiberglass layer on the first impact resistant layer with a thickness of 2.22 mm.

The E35 was obtained by stacking the aforesaid fiberglass layer on the first impact resistant layer with a thickness of 4.36 mm.

R7 and E34 to E35 were all tested for impact resistance under Test Condition B at room temperature (25° C.±2° C.), and the results were listed in Table 9. In the test for impact resistance, the hammer contacted the outer surface of the base layer (i.e. the surface opposite to the surface contacting the impact resistant layer) when falling.

TABLE 9

| | Thickness (mm) | | | | | | |
|---|---|---|---|---|---|---|---|
| | Base layer | First impact resistant layer | Time domain (mS) | $F_t$ (kN) | $F_s'$ (kN) | $F_s'/F_0'$ | $(F_s'/F_0')/$ thickness (%/mm) |
| R7 | 2.82 | — | 0.82 | 58.28 | — | — | — |
| E34 | 2.82 | 2.22 | 2.07 | 33.66 | 24.62 | 42.2% | 19.03 |
| E35 | 2.82 | 4.36 | 2.7 | 23.52 | 34.76 | 59.6% | 13.68 |

In Table 10, the first impact resistant layers of Examples 36 to 39 (E36 to E39) were formed by Preparation Method I adapting TPU-0.

The Reference Example 8 (R8) was a PP rigid plastic layer with a thickness of 2.15 mm and a Shore hardness of 68 D; the PP rigid plastic layer was formed by hot pressing the PP resin of Globalene® 6733 purchased from LCY Chemical Corp.

The E36 was obtained by stacking the aforesaid PP rigid plastic layer on the first impact resistant layer with a thickness of 1.97 mm.

The E37 was obtained by stacking the aforesaid PP rigid plastic layer on the first impact resistant layer with a thickness of 4.19 mm.

The Reference Example 9 (R9) was a PC rigid plastic layer with a thickness of 1.93 mm and a Shore hardness of 80 D; the PC rigid plastic layer was formed by injection molding the PC resin of Makrolon 2405 purchased from Bayer AG.

The E38 was obtained by stacking the aforesaid PC rigid plastic layer on the first impact resistant layer with a thickness of 2.15 mm.

The E39 was obtained by stacking the aforesaid PC rigid plastic layer on the first impact resistant layer with a thickness of 3.76 mm.

R8, R9 and E36 to E39 were all tested for impact resistance under Test Condition B at room temperature (25° C.±2° C.), and the results were listed in Table 10. In the test for impact resistance, the hammer contacted the outer surface of the base layer (i.e. the surface opposite to the surface contacting the impact resistant layer) when falling.

TABLE 10

| | Thickness (mm) | | | | | | |
|---|---|---|---|---|---|---|---|
| | Base layer | First impact resistant layer | Time domain (mS) | $F_t$ (kN) | $F_s'$ (kN) | $F_s'/F_0'$ | $(F_s'/F_0')$/thickness (%/mm) |
| R8 | 2.15 | — | 0.72 | 62.68 | — | — | — |
| E36 | 2.15 | 1.97 | 1.36 | 38.98 | 23.70 | 37.8% | 19.19 |
| E37 | 2.15 | 4.19 | 3.18 | 22.48 | 40.20 | 64.1% | 15.31 |
| R9 | 1.93 | — | 0.67 | 65.23 | — | — | — |
| E38 | 1.93 | 2.15 | 1.40 | 39.50 | 25.7 | 39.4% | 18.35 |
| E39 | 1.93 | 3.76 | 2.38 | 29.08 | 36.15 | 55.4% | 14.74 |

In Table 11, the first impact resistant layers of Examples 40 to 42 (E40 to E42) were formed by Preparation Method I adapting TPU-0.

The Reference Example 10 (R10) was an EVA foam elastomer layer with a thickness of 16.5 mm and a specific gravity of 0.2.

The E40 was obtained by stacking the aforesaid EVA foam elastomer layer on the first impact resistant layer with a thickness of 2.0 mm.

The Comparative Example 16 (C16) was obtained by stacking the aforesaid EVA foam elastomer layer on a melt-blown nonwoven fabric with a thickness of 2.0 mm; wherein the melt-blown nonwoven fabric was produced by Kuotane 300.

In the test for impact resistance, when the hammer dropped and contacted the outer surface of the first impact resistant layer of the impact resistant composite laminate, the example was named Example N-1, such as Example 40-1 (E40-1). On the contrary, when the hammer dropped and contacted the outer surface of the base layer of the impact resistant composite laminate, the example was named N-2, such as Example 40-2 (E40-2).

The Reference Example 11 (R11) was an expandable thermoplastic vulcanizate (ETPV) foam elastomer with a thickness of 12 mm and a Shore hardness of 50 C; the ETPV foam elastomer was formed by hot press foaming the ETPV resin of E342-50 purchased from Sunko Ink Co., Ltd.; E342-50 was a polymer elastomer material in which vulcanized EPDM microparticles were dispersed in a continuous combination phase of ethylene copolymer and polyolefin block copolymer.

The E41 was obtained by stacking the first impact resistant layer with a thickness of 2 mm on the aforesaid ETPV foam elastomer.

The E42 was obtained by stacking the first impact resistant layer with a thickness of 4 mm on the aforesaid ETPV foam elastomer.

In the test for impact resistance, the hammer contacted the outer surface of the first impact resistant layer (i.e. the surface opposite to the surface contacting the base layer) of the impact resistant composite laminate of E41 and E42 when the hammered fell.

R10, R11, E40-1, E40-2, E41 to E42, C16-1 and C16-2 were all tested for impact resistance under Test Condition A at room temperature (25° C.±2° C.), and the results were listed in Table 11.

TABLE 11

| | Thickness (mm) | | | | | | |
|---|---|---|---|---|---|---|---|
| | Base layer | First impact resistant layer | Time domain (mS) | $F_t$ (kN) | $F_s'$ (kN) | $F_s'/F_0'$ | $(F_s'/F_0')$/thickness (%/mm) |
| Blank | — | — | 0.7 | 96.35 | — | — | — |
| R10 | 16.5 | — | 4.19 | 40.46 | — | — | — |
| E40-1 | 16.5 | 2 | 6.31 | 26.02 | 14.44 | 35.7% | 17.8 |
| E40-2 | 16.5 | 2 | 5.37 | 29.88 | 10.58 | 26.1% | 13.1 |
| C16-1 | 16.5 | 2 | 4.66 | 35.10 | 5.36 | 13.2% | 6.60 |
| C16-2 | 16.5 | 2 | 4.35 | 37.83 | 2.63 | 6.5% | 3.30 |
| R11 | 12 | — | 1.81 | 63.34 | — | — | — |
| E41 | 12 | 2 | 4.04 | 39.42 | 23.92 | 37.8% | 18.9 |
| E42 | 12 | 4 | 5.36 | 28.14 | 35.2 | 55.6% | 13.9 |

In Table 12, the first impact resistant layers of Examples 43 to 48 (E43 to E48) were formed by Preparation Method I adapting TPU-0.

The Reference Example 12 (R12) was an EVA foam elastomer with a thickness of 3.75 mm.

The E43 was obtained by stacking the first impact resistant layer with a thickness of 3.82 mm on the aforesaid EVA foam elastomer.

The Reference Example 13 (R13) was an E342-50 foam elastomer with a thickness of 11.5 mm.

The E44 was obtained by stacking the first impact resistant layer with a thickness of 2 mm on the aforesaid E342-50 foam elastomer with a thickness of 11.5 mm.

The E45 was obtained by stacking the first impact resistant layer with a thickness of 4 mm on the aforesaid E342-50 foam elastomer.

The Reference Example 14 (R14) was an E342-35 foam elastomer with a thickness of 7.1 mm and Shore hardness of 35 C. Wherein the E342-35 foam elastomer was formed by hot press foaming an ETPV resin of E342-35 purchased from Sunko Ink Co., Ltd.; E342-35 was a polymer elastomer material in which vulcanized EPDM microparticles were dispersed in a continuous combination phase of ethylene copolymer and polyolefin block copolymer.

The E46 was obtained by stacking the first impact resistant layer with a thickness of 4 mm on the aforesaid E342-35 foam elastomer.

The Reference Example 15 (R15) was an E342-50 foam elastomer with a thickness of 3.32 mm.

The E47 was obtained by stacking the first impact resistant layer with a thickness of 3.82 mm on the aforesaid E342-50 foam elastomer with a thickness of 3.32 mm.

The Reference Example 16 (R16) was a styrofoam layer with a thickness of 3.29 mm and a specific gravity of 0.0754.

The E48 was obtained by stacking the first impact resistant layer with a thickness of 4.06 mm on the aforesaid styrofoam layer.

R12 to R16 and E43 to E48 were all tested for impact resistance under Test Condition B at room temperature (25° C.±2° C.), and the results were listed in Table 12. In the test for impact resistance, the hammer contacted the outer surface of the first impact resistant layer (i.e. the surface opposite to the surface contacting the base layer) when falling.

TABLE 12

| | Thickness (mm) | | | | | | |
|---|---|---|---|---|---|---|---|
| | Base layer | First impact resistant layer | Time domain (mS) | $F_t$ (kN) | $F_s'$ (kN) | $F_s'/F_0'$ | $(F_s'/F_0')/$ thickness (%/mm) |
| R12 | 3.75 | — | 0.78 | 54.40 | — | — | — |
| E43 | 3.75 | 3.82 | 3.76 | 23.94 | 30.46 | 56.0% | 14.66 |
| R13 | 11.5 | — | 5.92 | 19.18 | — | — | — |
| E44 | 11.5 | 2 | 8.28 | 12.10 | 7.08 | 36.9% | 18.46 |
| E45 | 11.5 | 4 | 9.07 | 10.24 | 8.94 | 46.6% | 11.65 |
| R14 | 7.1 | — | 0.98 | 49.04 | — | — | — |
| E46 | 7.1 | 4 | 5.53 | 17.00 | 32.04 | 65.3% | 16.33 |
| R15 | 3.32 | — | 0.86 | 53.36 | — | — | — |
| E47 | 3.32 | 3.82 | 3.80 | 23.42 | 29.94 | 56.1% | 14.69 |
| R16 | 3.29 | — | 0.77 | 58.97 | — | — | — |
| E48 | 3.29 | 4.06 | 2.64 | 25.50 | 33.47 | 56.8 | 13.98 |

In Table 13, the first impact resistant layers of Examples 49 and 51 (E49 and E51) were formed by Preparation Method I adapting TPU-0; the first impact resistant layer of Example 50 (E50) was formed by Preparation Method II adapting TPU-0.

The Reference Example 17 (R17) was a commercial impact resistant material I with a thickness of 7.1 mm (No. DS5115 HYPER KNEE/SHINxD3O).

The E49 was obtained by stacking the first impact resistant layer with a thickness of 4.0 mm on the commercial impact resistant material I.

The E50 was obtained by stacking the first impact resistant layer with a thickness of 3.52 mm on the commercial impact resistant material I.

The Comparative Example 17 (C17) was obtained by stacking with a LDPE foam layer with a thickness of 4.45 mm on the commercial impact resistant material I. In addition, the LDPE foam layer has a density of 0.058 g/cm$^3$.

The Reference Example 18 (R18) was a glass fiber prepreg with a moisture-cured reactive PUR with a thickness of 6.75 mm of a commercial impact resistant material II.

The E51 was obtained by stacking the first impact resistant layer with a thickness of 4.6 mm on the glass fiber prepreg with a moisture-cured reactive PUR of the commercial impact resistant material II.

The Comparative Example 18 (C18) was obtained by stacking with the LDPE foam layer with the thickness of 4.45 mm on the glass fiber prepreg with a moisture-cured reactive PUR of the commercial impact resistant material II.

In the test for impact resistance, when the hammer dropped and contacted the outer surface of the first impact resistant layer of the impact resistant composite laminate, the examples were named Example N-1, such as Example 49-1 (E49-1) and Example 51-1 (E51-1). On the contrary, when the hammer dropped and contacted the outer surface of the base layer of the impact resistant composite laminate, the examples were named N-2, such as Example 49-2 (E49-2) and Example 51-2 (E51-2).

In the test for impact resistance, the hammer contacted the outer surface of the first impact resistant layer (i.e. the surface opposite to the surface contacting the base layer) of the impact resistant composite laminate of E50 when the hammer fell.

R17, R18, E49-1, E49-2, E50, E51-1, E51-2, C17-1, C17-2, C18-1 and C18-2 were all tested for impact resistance under Test Condition A at room temperature (25° C.±2° C.), and the results were listed in Table 13.

TABLE 13

| | Thickness (mm) | | | | | | |
|---|---|---|---|---|---|---|---|
| | Base layer | First impact resistant layer | Time domain (mS) | $F_t$ (kN) | $F_s'$ (kN) | $F_s'/F_0'$ | $(F_s'/F_0')/$ thickness (%/mm) |
| R17 | 7.1 | — | 2.53 | 41.44 | — | — | — |
| E49-1 | 7.1 | 4.0 | 4.26 | 28.03 | 13.41 | 32.4% | 8.09 |
| E49-2 | 7.1 | 4.0 | 4.29 | 28.79 | 12.65 | 30.5% | 7.63 |
| E50 | 7.1 | 3.52 | 4.18 | 28.91 | 12.53 | 30.2% | 8.59 |
| C17-1 | 7.1 | 4.45 | 3.90 | 36.49 | 4.95 | 11.9% | 2.68 |
| C17-2 | 7.1 | 4.45 | 3.97 | 35.92 | 5.52 | 13.3% | 2.99 |
| R18 | 6.75 | — | 1.36 | 63.89 | — | — | — |
| E51-1 | 6.75 | 4.6 | 2.57 | 36.61 | 27.28 | 42.7% | 9.28 |
| E51-2 | 6.75 | 4.6 | 3.03 | 32.58 | 31.31 | 49.0% | 10.65 |
| C18-1 | 6.75 | 4.45 | 1.74 | 55.56 | 8.33 | 13.0% | 2.93 |
| C18-2 | 6.75 | 4.45 | 2.02 | 53.41 | 10.48 | 16.4% | 3.69 |

In Table 14, the first impact resistant layers of Examples 52 and 53 (E52 and E53) were formed by Preparation Method I adapting TPU-0.

The Reference Example 19 (R19) was the commercial impact resistant material I with the thickness of 7.1 mm.

The E52 was obtained by stacking the first impact resistant layer with a thickness of 4.0 mm on the commercial impact resistant material I.

The Reference Example 20 (R20) was the glass fiber prepreg with a moisture-cured reactive PUR with a thickness of 6.75 mm of the commercial impact resistant material II.

The E53 was obtained by stacking the first impact resistant layer with a thickness of 4.6 mm on the glass fiber prepreg with a moisture-cured reactive PUR of the commercial impact resistant material II.

The Comparative Example 19 (C19) was obtained by stacking with the aforesaid LDPE foam layer with a thickness of 4.5 mm on the glass fiber prepreg with a moisture-cured reactive PUR of the commercial impact resistant material II.

In the test for impact resistance, when the hammer dropped and contacted the outer surface of the first impact resistant layer of the impact resistant composite laminate, the examples were named Example N-1, such as Example 52-1 (E52-1) and Example 53-1 (E53-1). On the contrary, when the hammer dropped and contacted the outer surface of the base layer of the impact resistant composite laminate, the examples were named N-2, such as Example 52-2 (E52-2) and Example 53-2 (E53-2).

R19, R20, E52-1, E52-2, E53-1, E53-2, C19-1 and C19-2 were all tested for impact resistance under Test Condition B at room temperature (25° C.±2° C.), and the results were listed in Table 14.

TABLE 14

| | Thickness (mm) | | | | | |
|---|---|---|---|---|---|---|
| | Base layer | First impact resistant layer | Time domain (mS) | $F_t$ (kN) | $F_s'$ (kN) | $F_s'/F_0'$ | $(F_s'/F_0')/$ thickness (%/mm) |
| R19 | 7.1 | — | 5.19 | 14.42 | — | — | — |
| E52-1 | 7.1 | 4.0 | 6.55 | 9.88 | 4.54 | 31.5% | 7.87 |
| E52-2 | 7.1 | 4.0 | 6.63 | 10.04 | 4.38 | 30.4% | 7.59 |
| R20 | 6.75 | — | 2.14 | 30.31 | — | — | — |
| E53-1 | 6.75 | 4.6 | 4.26 | 18.33 | 11.98 | 39.5% | 8.59 |
| E53-2 | 6.75 | 4.6 | 4.36 | 18.00 | 12.31 | 40.6% | 8.83 |
| C19-1 | 6.75 | 4.5 | 3.54 | 27.85 | 2.46 | 8.1% | 1.82 |
| C19-2 | 6.75 | 4.5 | 4.11 | 27.15 | 3.16 | 10.4% | 2.34 |

In Table 15, the first impact resistant layers of Examples 54 to 56 (E54 and E56) were formed by Preparation Method I adapting TPU-0.

The Reference Example 21 (R21) was a laminate comprising a PP rigid plastic layer with the thickness of 2.14 mm and a Shore hardness of 68 D and the E342-35 foam elastomer with a thickness of 7.1 mm.

The E54 was obtained by stacking the first impact resistant layer with a thickness of 2.01 mm on the PP rigid plastic layer (as base layer) and then stacking the E342-35 foam elastomer (as surface layer) on the first impact resistant layer.

The E55 was obtained by stacking the first impact resistant layer with a thickness of 4.01 mm on the PP rigid plastic layer (as base layer) and then stacking the E342-35 foam elastomer (as surface layer) on the first impact resistant layer.

The Reference Example 22 (R22) was a laminate comprising the PP rigid plastic layer with the thickness of 2.14 mm and the E342-50 foam elastomer with a thickness of 12 mm.

The E56 was obtained by stacking the first impact resistant layer with a thickness of 4.01 mm on the PP rigid plastic layer (as base layer) and then stacking the E342-50 foam elastomer (as surface layer) on the first impact resistant layer.

R21, R22 and E54 to E56 were all tested for impact resistance under Test Condition A at room temperature (25° C.±2° C.), and the results were listed in Table 15. In the test for impact resistance, the hammer contacted the outer surface of the base layer (i.e. the surface opposite to the surface contacting the impact resistant layer) when falling.

Test 2: Falling Mass Shock Absorption Test

According to the Test Method SATRA TM142, R10, E40-1 and C16-1 were analyzed by a dynamic shock absorption test machine (STM 479) equipped with a fixed mass striker, which was dropped vertically from a predetermined height onto a test sample, and the resulting g value, the maximum deceleration, the rebound ratio and the indent depth of R10, E40-1 and C16-1 were listed in Table 16. R10, E40-1 and C16-1 respectively had an EVA foam elastomer as base layer. The relevant parameters were recorded as follows.

1. Mass of striker: 8.5 kg;
2. Predetermined height: 50±0.5 mm;
3. Potential energy provided by the striker: 4.16 J.

TABLE 16

| Test sample No. | R10 | E40-1 | C16-1 |
|---|---|---|---|
| Thickness of base layer (mm) | 16.5 | 16.5 | 16.5 |
| Thickness of first impact resistant layer (mm) | 0 | 2 | 2 |
| g value | 15 | 12 | 14 |
| Maximum deceleration (m/s$^2$) | 145 | 125 | 135 |
| Rebound ratio (%) | 46 | 31 | 44 |
| Indent depth (mm) | 10.5 | 9.0 | 10 |

Test 3: Recycling Capability Test

TPU-MB, which was a melt-blown nonwoven fabric prepared by Preparation Method I with a thickness of 2 mm, and TPU-H, which was a spunbond nonwoven fabric prepared by Preparation Method II with a thickness of 2 mm, were analyzed to obtain their Mn, Mw and Mp, and the results were listed in Table 17.

TABLE 15

| | Thickness (mm) | | | | | | | |
|---|---|---|---|---|---|---|---|---|
| | Base layer | First impact resistant layer | Surface layer | Time domain (mS) | $F_t$ (kN) | $F_s'$ (kN) | $F_s'/F_0'$ | $(F_s'/F_0')/$ thickness (%/mm) |
| R21 | 2.14 | — | 7.1 | 0.88 | 81.19 | — | — | — |
| E54 | 2.14 | 2.01 | 7.1 | 2.04 | 56.34 | 24.85 | 30.6% | 15.23 |
| E55 | 2.14 | 4.01 | 7.1 | 4.00 | 38.90 | 42.29 | 52.1% | 12.99 |
| R22 | 2.14 | — | 12.0 | 2.59 | 51.5 | — | — | — |
| E56 | 2.14 | 4.01 | 12.0 | 5.24 | 31.4 | 20.1 | 39.0% | 9.73 |

After that, the TPU-MB and the TPU-H were respectively recycled and mixed by a plastometer to simulate reprocessing, and then formed by hot pressing with a mold of 12 mm*12 mm*2 mm; finally, the TPU-MB-R hot press sheet and the TPU-H-R hot press sheet were obtained.

The above process was under a normal operation, and the appearance of the TPU-MB-R sheet of hot press and the TPU-H-R sheet of hot press were normal. Then, Mn, Mw and Mp of the TPU-MB-R sheet of hot press and the TPU-H-R sheet of hot press were analyzed, and the results were listed in Table 17.

TABLE 17

| Type of test sample | TPU-MB | | TPU-H | |
| --- | --- | --- | --- | --- |
| | Virginal TPU-MB Nonwoven fabric | One-recycled TPU-MB-R Sheet of hot press | Virginal TPU-H Nonwoven fabric | One-recycled TPU-H-R Sheet of hot press |
| Mn | 17185 | 18907 | 31093 | 28329 |
| Mw | 37876 | 37894 | 69508 | 58276 |
| Mp | 38995 | 38495 | 69897 | 54120 |

From the results in Tables 4 to 15, the impact resistant composite laminates of the present disclosure indeed reduced at least 20% of the external impact.

In the cases of having the same or similar thickness, for example, a comparison between E21 and C14 in Table 6, a comparison of E23 and C15 in Table 6, a comparison of E40-1 and C16-1 in Table 11, a comparison of E40-2 and C16-2 in Table 11, a comparison of E49-1 and C17-1 in Table 13, a comparison of E49-2 and C17-2 in Table 13, a comparison of E51-1 and C18-1 in Table 13, a comparison of E51-2 and C18-2 in Table 13, a comparison of E53-1 and C19-1 in Table 14 and a comparison of E53-2 and C19-2 in Table 14, the first impact resistant layers formed by the TPU comprising the structural unit represented by the Formula (I) had a better impact resistance than the impact resistant layers formed by other materials without the TPU having the structural unit represented by the Formula (I).

In addition, from the results of Tables 6 and 7, it can prove that even though the impact resistant composite laminate of the present disclosure was formed by overlapping the impact resistant layer of the present disclosure and the base layer composed of general fabrics such as Nylon fabric, cotton cloth and leather, the impact resistant layer in the impact resistant composite laminate still can maintain the impact resistance per unit thickness. Therefore, it is beneficial to manufacture of the personal protective equipment.

From the results of Tables 8 to 10, it can prove that even though the impact resistant composite laminate of the present disclosure was formed by overlapping the impact resistant layer of the present disclosure and a general rigid plastic layer, the impact resistant layer in the impact resistant composite laminate still can maintain the impact resistance per unit thickness. Further, from the results of Tables 9 and 10, when the base layer is a fiberglass layer, a PP rigid plastic layer or a PC rigid plastic layer, the impact resistant layer of the impact resistant composite laminate even can have an improved impact resistance per unit thickness.

From a comparison between E42 in Table 11 and E1 in Table 1, under the Test Condition A, the impact resistant layer of the impact resistant composite laminate can have a better impact resistance per unit thickness than the only single layer of the impact resistant layer since the impact resistant layer of the impact resistant composite laminate overlaps the foam elastomer.

From a comparison between E51-1 and C18-1 in Table 13, a comparison between E51-2 and C18-2 in Table 13, a comparison between E53-1 and C19-1 in Table 14 and a comparison between E53-2 and C19-2 in Table 14, the impact resistant composite laminate of the present disclosure indeed had a better impact resistance than the commercial impact resistant materials no matter under the Test Condition A or B.

From the comparison among R10, E40-1 and C16-1 in Table 16, the impact resistant composite laminate of E40-1 had a smallest g value and a smallest indent depth in the shock absorption test, so it meant that the impact resistant composite laminate of the present disclosure had a better impact resistance.

In addition, from the results in Table 17, the impact resistant layer formed by the TPU comprising the structural unit represented by Formula (I) after reprocessing still maintained 75% or more of the molecular weight such as Mn, Mw and Mp. It can be proved that the impact resistant layer of the present disclosure is suitable to recycle and reuse.

Application Example 1

Figure 4:
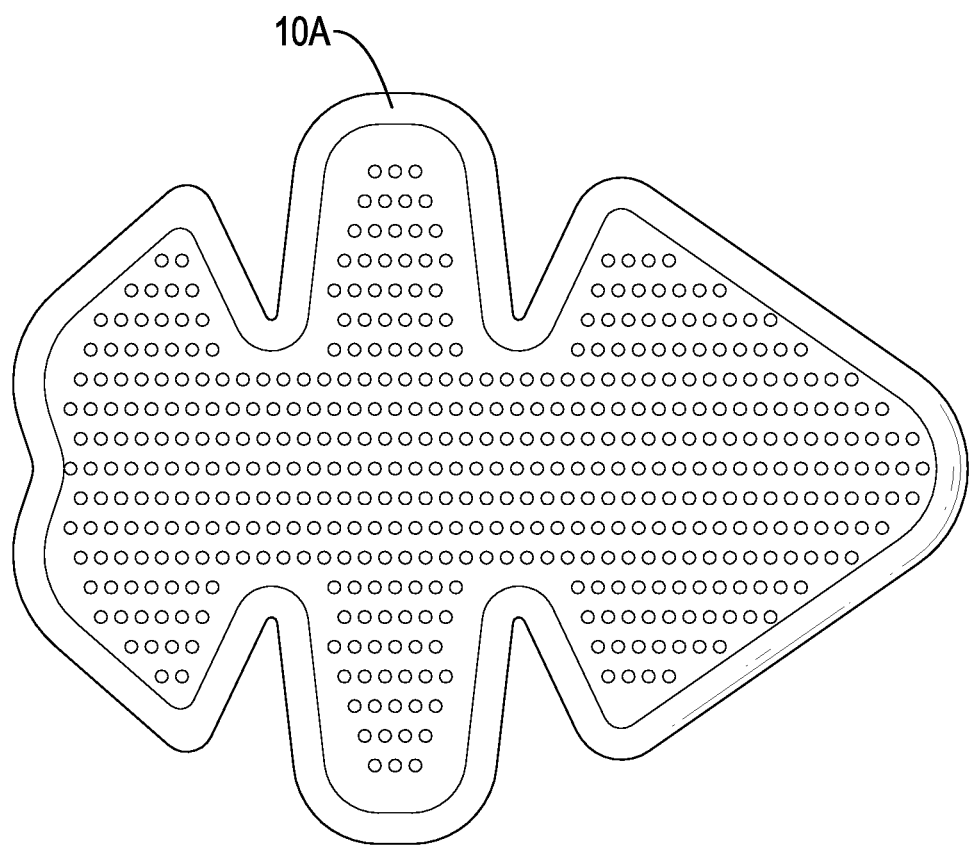
FIG. 4 is a schematic top view illustrating that an impact resistant layer of the present disclosure was formed for a personal protective equipment.
Figure 5:
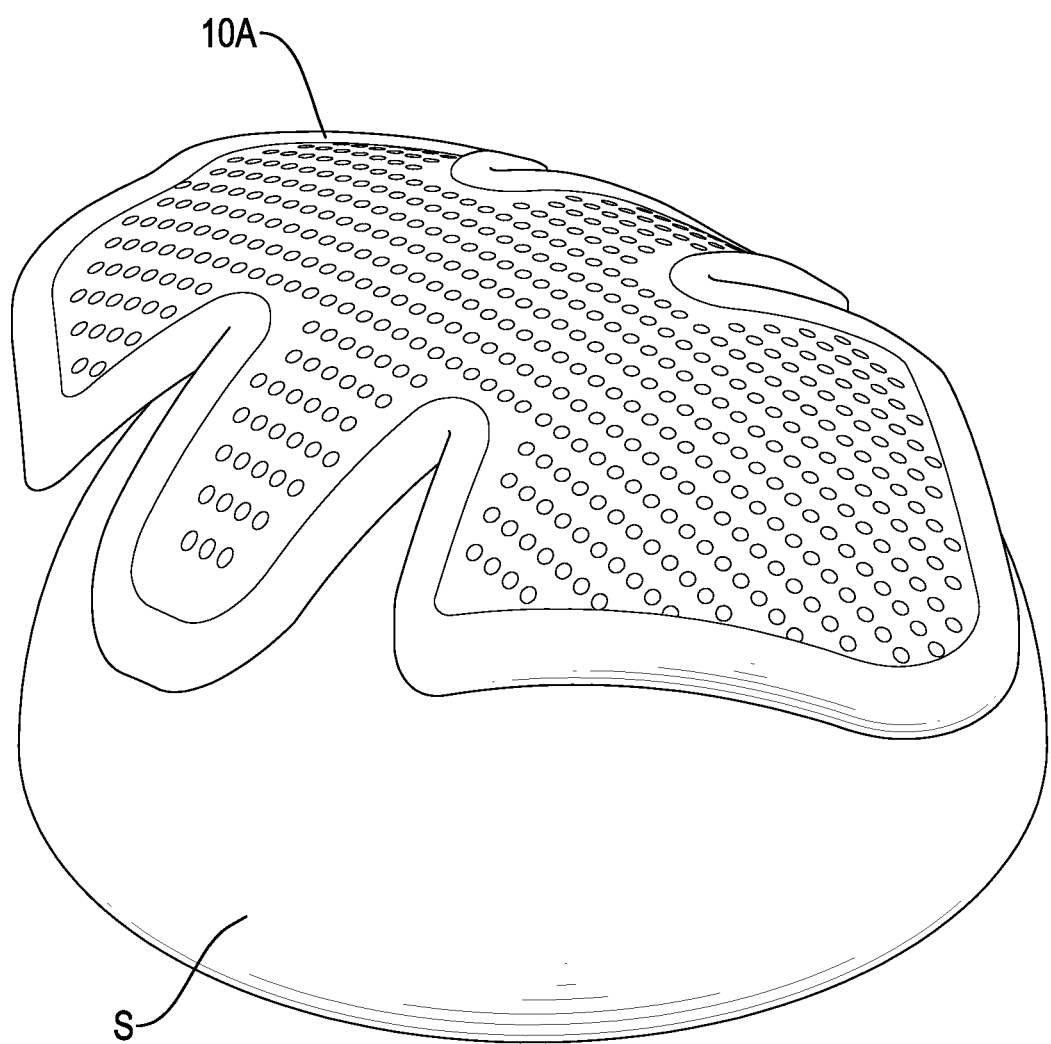
FIG. 5 is a schematic diagram illustrating that the impact resistant layer of FIG. 4 was being shaped.
Figure 6:
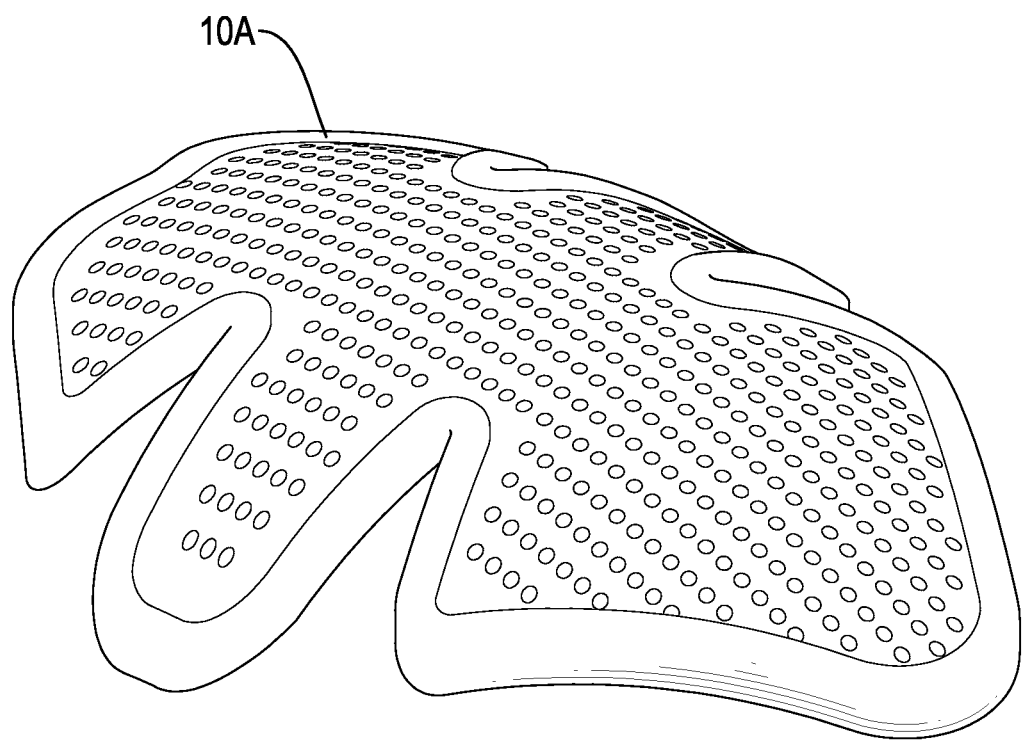
FIG. 6 is a schematic stereogram diagram illustrating that a finished product after the impact resistant layer of FIG. 5 was shaped.

With reference to FIGS. 4 to 6, Application Example 1 was using an impact resistant layer 10A for application of a knee pad.

First, 4 pieces of TPU-MB obtained by the aforementioned Preparation Method I were stacked to form a laminate, and then the laminate was cut to form a desired shape with scissors or a cutter. After that, the cut laminate was placed to a mold with many needles for 3 min. The temperature of the mold was set at 120° C., so the 4 pieces of TPU-MB were adhered to each other. Finally, the impact resistant layer 10A with many penetrating holes as shown in FIG. 4 was obtained. At this time, the impact resistant layer 10A was flat.

According to the European Standard EN1621-1: 2012, the aforementioned flat impact layer 10A was subjected to an impact resistance performance test. The impact resistance performance test was repeated for three times, and the values of resulting penetrating impact ($F_t$) were respectively 24.82 kN, 27.49 kN, and 29.17 kN; therefore, the average Ft was 27.2 kN. It can be seen that the impact resistant layer 10A achieved Level 1 performance.

In addition, the impact resistant layer 10A may be placed in an oven at about 60° C. to 70° C. for about 30 minutes. Since the Tg of the TPU forming the impact resistant layer 10A was between ambient temperature and normal body temperature, the temperature of the oven can make the aforementioned impact resistant layer 10A easily shaped. For example, as shown in FIG. 5, a model bracket S simulating the curvature of user's knee was used to shape the impact resistant layer 10A; after the impact resistant layer 10A was shaped and cooled to room temperature, as shown in FIG. 6, the impact resistant layer 10A had a three-dimensional shape.

In addition, the impact-resistant layer 10A may be placed in an outer covering such as a bag. The outer covering may entirely cover the impact resistant layer 10A, or the outer covering may partially cover the impact resistant layer 10A; for example, the aforementioned outer covering may have a hollow-out design.

In other embodiments, the impact-resistant layer 10A may be used with at least one connecting element such as a bonding belt, a pair of hook-and-loop fasteners and a pair of buckles, but it is not limited thereto.

Since the TPU can be easily shaped at a temperature equal to or slightly higher than human body temperature, the personal protective equipment comprising the impact-resistant layer 10A is applicable because it not only fits the corresponding body part covered by the personal protective equipment, but also can be repeatedly re-shaped by an elevated temperature.

In other application examples, the impact-resistant layer 10A may be an impact resistant composite laminate comprising an impact resistant layer of the present disclosure, such as the impact resistant composite laminates shown in FIGS. 1 to 3.

In summary, in view of the aforementioned results, the impact resistant layer with a specific thickness which is formed by the TPU comprising the structural unit represented by Formula (I) can provide a good impact resistance; moreover, the impact resistant composite laminate comprising the aforesaid impact resistant layer can even have a better impact resistance. That is to say, the unexpected results are proven.

Even though numerous characteristics and advantages of the present disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. An impact resistant composite laminate comprising a base layer and a first impact resistant layer overlapping the base layer; wherein the first impact resistant layer is formed by a thermoplastic polyurethane; wherein the thermoplastic polyurethane comprises a structural unit represented by Formula (I):

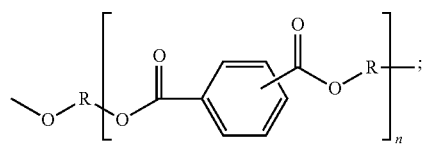

(I)

in Formula (I), wherein each R independently is an alkylene group having 2 to 8 carbon atoms or $CH_2CH_2OCH_2CH_2$;
n is a number from 2 to 13;
the structural unit has a number-average molecular weight ranging from 700 g/mole to 2500 g/mole;
the thermoplastic polyurethane comprises a structural unit represented by Formula (II):

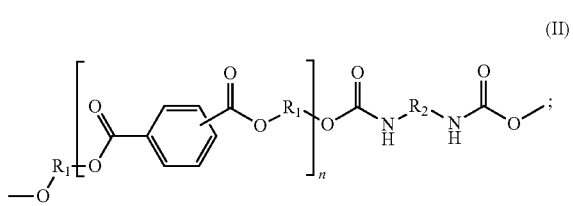

(II)

in Formula (II), each $R_1$ in Formula (II) corresponds to R in Formula (I):
$R_2$ is

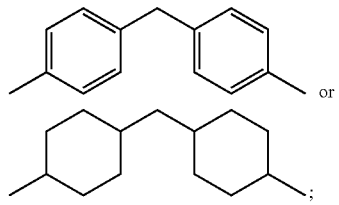

or

;

and n in Formula (II) is the same as n in Formula (I); and
wherein the first impact resistant layer has a thickness of larger than 2 millimeters and smaller than or equal to 10 millimeters;
wherein the base layer comprises a foam elastomer, a fiberglass layer or any combinations thereof;
wherein when the base layer comprises the foam elastomer, the material of the foam elastomer comprises ethylene-vinyl acetate or thermoplastic vulcanizate comprising ethylene propylene diene monomer, and the base layer has a thickness ranging from 2 millimeters to 18 millimeters;
when the base layer comprises the fiberglass layer, the fiberglass layer is a glass fiber prepreg with a moisture-cured reactive polyurethane resin, and the base layer has a thickness ranging from 1 millimeter to 7 millimeters.

2. The impact resistant composite laminate according to claim 1, wherein the impact resistant composite laminate further comprises a surface layer, and the first impact resistant layer is disposed between the surface layer and the base layer; wherein the surface layer comprises a rigid plastic layer, a leather, a foam elastomer, a woven fabric, a knit fabric, a nonwoven fabric, a fiberglass layer or any combinations thereof.

3. The impact resistant composite laminate according to claim 2, wherein the impact resistant composite laminate further comprises a second impact resistant layer, and the base layer is disposed between the first impact resistant layer and the second impact resistant layer; wherein the second impact resistant layer is formed by the thermoplastic polyurethane, and the second impact resistant layer has a thickness of larger than 1.5 millimeters.

4. The impact resistant composite laminate according to claim 1, wherein the impact resistant composite laminate further comprises a second impact resistant layer, and the base layer is disposed between the first impact resistant layer and the second impact resistant layer; wherein the second impact resistant layer is formed by the thermoplastic polyurethane, and the second impact resistant layer has a thickness of larger than 1.5 millimeters.

5. The impact resistant composite laminate according to claim 1, wherein the impact resistant composite laminate is used for applications of handles, personal protective equipment, machinery safety equipment or medical protective equipment.

6. The impact resistant composite laminate according to claim 1, wherein the impact resistant composite laminate achieves Level 1 of European Standard EN1621-1: 2012.

* * * * *